(12) United States Patent
Racabi

(10) Patent No.: US 7,882,259 B2
(45) Date of Patent: *Feb. 1, 2011

(54) METHOD AND SYSTEM FOR REAL-TIME ACCESSING OF DIGITAL DATA STORED ON A REMOTE TERMINAL

(75) Inventor: Amram Racabi, Neve Ziv (IL)

(73) Assignee: Mecanto Ltd., Kibbutz Sa'ar (IL)

( * ) Notice: Subject to any disclaimer, the term of this patent is extended or adjusted under 35 U.S.C. 154(b) by 311 days.

This patent is subject to a terminal disclaimer.

(21) Appl. No.: 12/081,390

(22) Filed: Apr. 15, 2008

(65) Prior Publication Data

US 2009/0259761 A1 Oct. 15, 2009

(51) Int. Cl.
*G06F 15/16* (2006.01)
(52) U.S. Cl. .................. 709/231; 709/201; 709/217
(58) Field of Classification Search .................. None
See application file for complete search history.

(56) References Cited

U.S. PATENT DOCUMENTS

| 6,324,650 | B1 | 11/2001 | Ogilvie |
| 7,299,498 | B2 | 11/2007 | Lee et al. |
| 2005/0203893 | A1 | 9/2005 | Bourdoncle et al. |
| 2006/0051055 | A1* | 3/2006 | Ohkawa ................ 386/46 |
| 2010/0005177 | A1* | 1/2010 | Cagenius ............. 709/228 |

FOREIGN PATENT DOCUMENTS

| WO | 01/47248 A2 | 6/2001 |
| WO | 02/099716 A1 | 12/2002 |

* cited by examiner

*Primary Examiner*—John B. Walsh
(74) *Attorney, Agent, or Firm*—Susanne M. Hopkins; Derek Richmond; Sung Yeop Chung

(57) ABSTRACT

The present invention relates to a system and method of providing at least one digital content item substantially in real-time from at least one user's terminal to another user's terminal over a data network, said method comprises: (a) indexing at least one digital content item provided from at least one user's terminal over a data network, giving rise to an items index; (b) receiving a request to provide a digital content item to user's terminal over said data network; (c) conducting a search for the requested digital content item by means of said items index; and (d) if said requested digital content item is found within said items index, providing said requested digital content item from said at least one user's terminal to another user's terminal over said data network by streaming said digital content item substantially in real-time to said another user's terminal.

39 Claims, 3 Drawing Sheets

METHOD AND SYSTEM FOR REAL-TIME ACCESSING OF DIGITAL DATA STORED ON A REMOTE TERMINAL

FIELD OF THE INVENTION

The present invention relates to digital data sharing. More particularly, the present invention relates to a method and system for real-time accessing of digital data stored on (provided from) a remote terminal over a data network, such as the Internet.

BACKGROUND OF THE INVENTION

In the last decade, the WWW (World Wide Web) has expanded dramatically. More and more people around the world connect to the Internet, and have thus become part of the worldwide computer network. Nowadays, most data (songs, video films, photos, documents and the like) is usually organized and stored in digital file formats on home personal computers. Thus, when at home, the users can easily access such data. However, when outside the home, for example, at work or while traveling away from home locations, accessing such digital data becomes significantly complicated. The user, wishing to remotely access a file (e.g., a song) stored on his home computer, has to first install on his remote terminal a dedicated program (such as pcAnywhere™ program of Symantec™ Corporation located in United States) that enables him to connect to his said home computer. Furthermore, installing such a program on work terminals or on shared terminals in public places (e.g., Internet café), is usually forbidden due to various reasons, such as security, unauthorized storage usage, etc. In addition, when the user connects to his home computer (after installing such a program), he has to fully download and store the downloaded file (e.g., a song) within his remote terminal (e.g., at work or in a public place) before starting to play it, and this is also usually forbidden. Finally, only after the song is downloaded and stored, the user can start listening to it.

The problem of accessing digital data that is provided from remote terminals has been recognized in the prior art, and various applications have been developed to provide a solution. According to the prior art, US 2005/0203893 for example, is directed to a program for accessing information records on a computer, the program being adapted for operating on the computer and comprising: an indexer adapted to build an index of information records stored in at least two information systems present on the computer; wherein an information system provides access to information records using at least an interface such as a user interface, an application programming interface, or a procedure call interface; an agent adapted to receive requests from a terminal remote from the computer and to serve said requests using said index. A person is thus able to gain access to his or her own information stored on his or her personal computer at home or at work, using for instance another computer.

WO 01/47248 discloses a remote playback system that provides playback or another type of controlled delivery of an information signal available from a first device in response to one or more commands received from a second device, in situations in which the second device is in a location remote from the first device. The server receives control commands from the second device, and delivers the information signal over the network connection from the first device to the second device in response to the commands.

US 2006/0051055 presents a content remote watching system, a PVR (Personal Video Recorder) owned by a user at home, a server operated or administrated by a carrier, and a mobile phone carried by the user, which are all accommodated in a network. In this system, the user can access a Web site operated or administrated on the server, and request the reproduction of the content recorded on the PVR. The PVR transmits data to the mobile phone, in accordance with an instruction from the server. In the mobile phone, the data is reproduced and is watched by the user.

The present invention has many advantages over the prior art. For example, the present invention enables streaming of digital data substantially in real-time from one user's terminal to another.

Another advantage of the present invention is providing a method and system that enables streaming of digital data between various types of users' terminals over a data network, such as personal computers, laptops, mobile devices (cellular phones, PDAs (Personal Digital Assistants), etc.) and the like.

A further advantage of the present invention is providing a method and system for streaming digital data substantially in real-time over a data network, wherein the terminal of a user from which the data is streamed can stay off-line, if said data has been previously streamed over said data network.

Still a further advantage of the present invention is providing a method and system for streaming digital data substantially in real-time over a data network, which is user friendly.

Other advantages of the present invention will become apparent as the description proceeds.

SUMMARY OF THE INVENTION

The present invention relates to a method and system for real-time accessing of digital data stored on (provided from) a remote terminal over a data network, such as the Internet.

The server is capable of providing a digital content item substantially in real-time from at least one user's terminal to another user's terminal by streaming it to said another user's terminal, said server comprises means configured to:

a) interconnect at least two user's terminals over a data network;

b) obtain an index of at least one digital content item provided from at least one user's terminal over said data network; and c) enable providing the digital content item, indicated within said index, from said at least one user's terminal to another user's terminal over said network by enabling streaming it substantially in real-time to said another user's terminal.

According to an embodiment of the present invention, the digital content item is streamed from the at least one user's terminal to said server.

According to another embodiment of the present invention, the digital content item is streamed from said server to another user's terminal.

The system is configured to provide a digital content item substantially in real-time from at least one user's terminal to another user's terminal over a data network, said system comprises:

a) at least two users' terminals connected to a data network, wherein at least one of said at least two users' terminals provides a digital content item to another user's terminal; and b) a server connected to said data network, said server interconnecting said at least two users' terminals and enabling providing said digital content item from said at least one user's terminal to said another one user's terminal by streaming it substantially in real-time to said another user's terminal.

According to an embodiment of the present invention, system is configured to stream a digital content item substantially in real-time from at least one user's terminal to another user's terminal over a data network, upon receiving a request from the at least one user to remotely access said digital content item, without uploading said content item onto said another user's terminal.

According to an embodiment of the present invention, the streaming from the one user's terminal to another user's terminal is conducted via a server.

According to another embodiment of the present invention, the server is configured by means of at least one of the following:
a) a web server for hosting at least one web site, and for enabling users' terminals to connect to said at least one web site;
b) a data streaming server for enabling streaming the at least one digital content item from the one user's terminal to one or more other users' terminals; and
c) a storage server for storing the at least one digital content item to be provided to said one or more other users' terminals.

According to still another embodiment of the present invention, the at least one digital content item is cached within the server.

According to still another embodiment of the present invention, the cached digital content item is streamed from the server to the at least one user's terminal.

According to still another embodiment of the present invention, the at least one digital content item is uploaded to the server, prior to streaming it to the one or more users' terminals.

According to still another embodiment of the present invention, a software component is installed on the user's terminal for indexing one or more content items provided from said user's terminal, giving rise to the items index.

According to a further embodiment of the present invention, the items index is provided to the server.

According to still a further embodiment of the present invention, the items index from users' terminals is unified within the server, giving rise to an overall items index.

According to still a further embodiment of the present invention, the user searches within the items index or within the overall items index, looking for a particular content item, which he wishes to remotely access.

According to still a further embodiment of the present invention, streaming the digital content item is controlled by means of the server.

According to still a further embodiment of the present invention, the streaming of the digital content item is controlled by means of the software component.

According to an embodiment of the present invention, the user registers within a Web site for enabling a remote access from his at least one user's terminal or for remotely accessing the digital content item from said at least one user's terminal.

According to another embodiment of the present invention, the user remotely accesses the content item for a predefined period of time.

According to still another embodiment of the present invention, the user that remotely accesses the content item makes a payment for accessing said content item.

According to still another embodiment of the present invention, the metadata of each content item is indicated within the items index.

The method of providing at least one digital content item substantially in real-time from at least one user's terminal to another user's terminal over a data network, said method comprises:
a) indexing at least one digital content item provided from at least one user's terminal over a data network, giving rise to an items index;
b) receiving a request to provide a digital content item to user's terminal over said data network;
c) conducting a search for the requested digital content item by means of said items index; and
d) if said requested digital content item is found within said items index, providing said requested digital content item from said at least one user's terminal to another user's terminal over said data network by streaming said digital content item substantially in real-time to said another user's terminal.

The method relates to streaming a digital content item substantially in real-time from at least one user's terminal to another user's terminal over a data network, upon receiving a request from the at least one user to remotely access said digital content item, without uploading said content item onto said another user's terminal.

According to an embodiment of the present invention, the method further comprises surfing to a predetermined Web site for searching for the particular content item.

The present invention also relates to a program storage device readable by machine, tangibly embodying a program of instructions executable by the machine to perform a method of providing at least one digital content item substantially in real-time from at least one user's terminal to another user's terminal over a data network, said method comprises:
a) indexing at least one digital content item provided from at least one user's terminal over a data network, giving rise to an items index;
b) receiving a request to provide a digital content item to user's terminal over said data network;
c) conducting a search for the requested digital content item by means of said items index; and
d) if said requested digital content item is found within said items index, providing said requested digital content item from said at least one user's terminal to another user's terminal over said data network by streaming said digital content item substantially in real-time to said another user's terminal.

The present invention further relates to a program storage device readable by machine, tangibly embodying a program of instructions executable by the machine to perform a method of streaming a digital content item substantially in real-time from at least one user's terminal to another user's terminal over a data network, upon receiving a request from the user to remotely access said digital content item, without uploading said content item onto said another user's terminal.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

Figure 1:
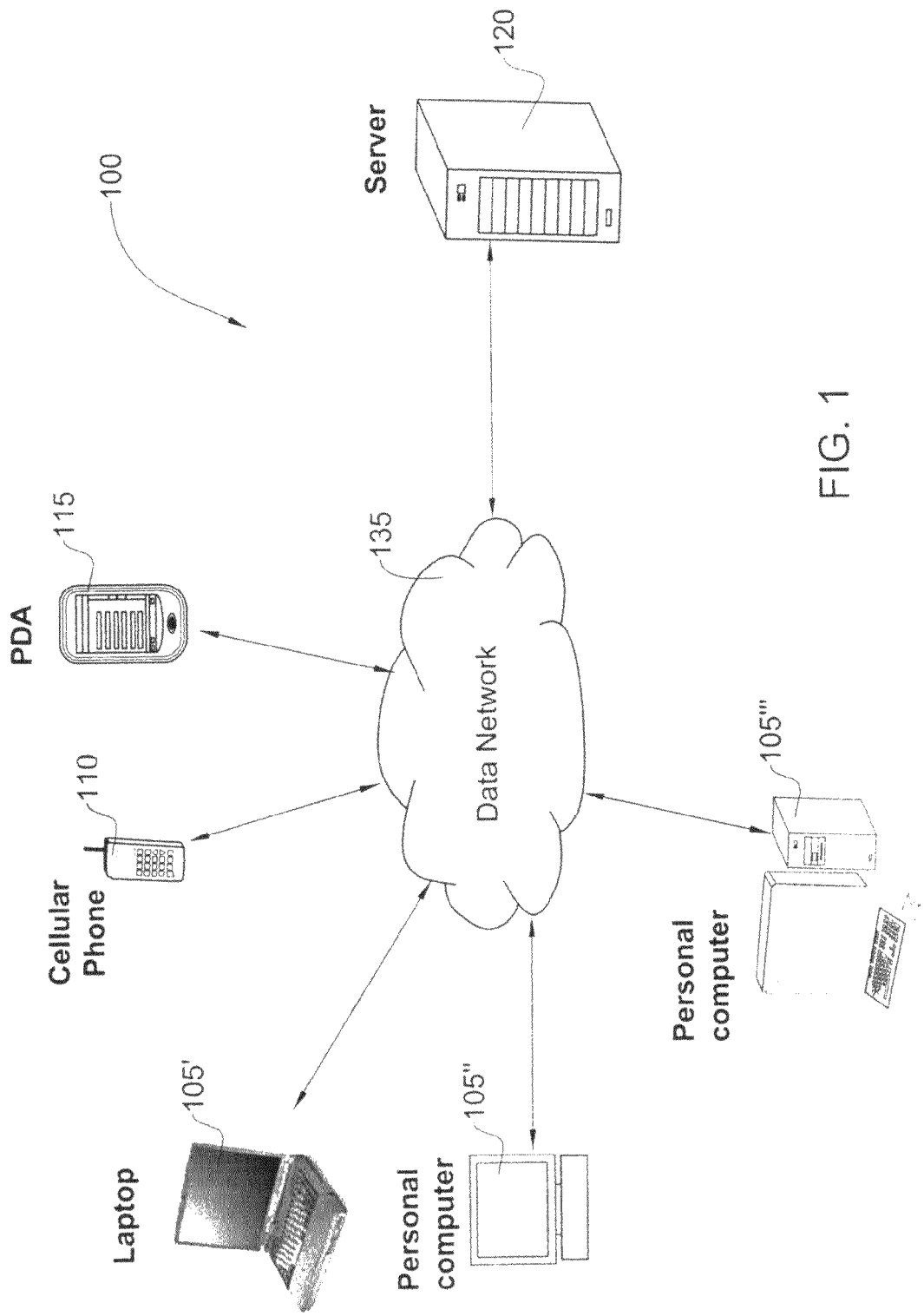
FIG. 1 is a schematic block diagram of a system for enabling remote access to digital content items over a data network (such as the Internet, cellular network, etc.), according to an embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PREFERRED EMBODIMENTS

In the following detailed description, numerous specific details are set forth in order to provide a thorough understanding of the invention. However, it will be understood by those skilled in the art that the present invention may be practiced without these specific details. In other instances, well-known methods, systems, procedures, components, circuits and the like have not been described in detail so as not to obscure the present invention.

Hereinafter, whenever the term "content item" or "item" is mentioned, it should be noted that it refers to any digital data, such as a digital file, a portion of a digital file, software code, etc. In addition, wherein the term "real-time" is mentioned, it can be interpreted as "substantially real-time", "near real-time" and the like.

FIG. 1 is a schematic block diagram of a system 100 for enabling remote access to digital content items over a data network (such as the Internet, cellular network, etc.), according to an embodiment of the present invention. System 100 comprises a plurality of users' Web terminals, such as personal computers 105', 105'', 105''', cellular phone 110, PDA (Personal Digital Assistant) 115 or any other stationary/mobile devices, connected to a data network 135; and a server 120, connected to said data network 135, for interconnecting said plurality of user's terminals and enabling a remote access to digital content items stored on (or to be provided from) at least one user's terminal, over said data network 135, to one or more other users' Web terminals.

According to an embodiment of the present invention, for remotely accessing digital content items stored on a Web terminal and/or providing an access to such content items from said Web terminal, a user of said Web terminal registers within a predefined Web site over data network 135. Then, the user downloads from said Web site a software component 130 to be installed on his network terminal (e.g., personal computer 105', cellular phone 110). Software component 130 determines digital content items stored on (or to be provided from) said personal computer 105', which are authorized by the user of said personal computer 105' for being accessed from other one or more remote terminals. For that, the user can store such content items within a predefined folder that is "recognized" by software component 130 (e.g., a folder named as "Sharing").

According to an embodiment of the present invention, software component 130 of each terminal indexes digital content items, stored within (or to be provided from) said each terminal, and then provides the items index to server 120. In addition, when a new content item is uploaded to the terminal, corresponding software component 130 can substantially immediately update the items index of said terminal. Also, the items index of each terminal can be updated, for example, once a day, twice a day, etc. The indexes of content items from all users' terminals can be unified, giving rise to an overall items index. Such overall items index can also be stored within server 120. Thus, a user wishing to access a particular content item, by registering and logging in a predefined Web site (that can be hosted by server 120) can see which items can be provided from each Web terminal over data network 135. The user can further search by means of said (overall) items index for a specific content item that he wishes to access. He can either search by means of the items index of each user's terminal and/or by means of the overall items index of all users' terminals connected to said data network 135.

It should be noted that according to an embodiment of the present invention, a user can search and remotely access digital content items provided from all users' terminals over data network 135, which are registered within the predefined Web site (that can be hosted by server 120). According to another embodiment of the present invention, the user can remotely access digital content items stored on (or provided from) his remote Web terminals: for example, when at work, the user can remotely access content items stored on his home computer(s) 105' from his cellular phone 110.

According to an embodiment of the present invention, software component 130 enables streaming the requested digital content item from the terminal on which it is installed to another user's terminal. It should be noted that streaming of the content items can be conducted via server 120. When a user requests to remotely access a particular content item from his user's terminal (e.g., cellular phone 110), server 120 communicates with a corresponding terminal that stores such an item (e.g., home personal computer 105'), and interconnects between said terminals. After that, software component 130 installed on said personal computer 105', starts streaming the requested content item to said cellular phone 110. The cellular phone 110 user can start using (e.g., listening, watching, playing, reading and the like) the content of the remotely accessed content item substantially in real-time, without the need to download and store it on his terminal. For example, if the remotely accessed content item is a song, then the cellular phone 110 user can start listening to the song substantially in real-time; if the remotely accessed content item is a video clip, then the cellular phone 110 user can start watching it substantially in real-time. Further, server 120 can cache the content item for later usage. Such content item caching can occur while the item (e.g., a digital file) is streamed from one user's terminal to another. According to another embodiment of the present invention, content items can be uploaded from a user's terminal to server 120, prior to streaming them to one or more user's terminals. Thus, when a user wishes to remotely access a content item stored on a remote user's terminal, while said content item is already cached (stored) by server 120, then such an item is provided to him directly from the cache (memory means) of server 120, and said remote user's terminal can stay offline.

According to an embodiment of the present invention, the content item can be remotely accessed for a predefined sum of money, e.g., $1 per minute, $10 per day, etc. Such a price can be set, for example, by a provider of server 120 and/or by a provider of software component 130 for enabling a user to remotely access one or more desired content items (e.g., songs, movies, photos, textual data, etc.). When a user remotely accesses a content item stored on his other terminal at a remote location (e.g., at home), then he can pay only to the above provider(s) for using such service. On the other hand, when a user remotely accesses a content item stored on (or provided from) the terminal of another user, then an additional payment may be requested by said another user. According to another embodiment of the present invention, the content item can be remotely accessed for a fixed price: for example, $100 for an unlimited period of time. In addition, the remote access cost can be set also according to the quality of the content item, the file size of said content item and corresponding server 120 storage space (memory means) to be used for caching said content item, etc.

According to an embodiment of the present invention, instead of receiving a payment, a user that provides a remote access to a content item can receive "credit points" for enabling another user to access such content item. For example, if accessing the content item costs $10, then said user (that provides the remote access) can receive 10 credit points, instead of $10 (for example, one "credit point" per $1). After that, he can access another content item from another user by using the accumulated "credit points". The "credit points" can be provided to each user according to various parameters, such as an access period of time, type of the content item (e.g., song, movie) to be accessed, category or genre of said content item, the quality of said content item, the file size of said content item and corresponding server 120 storage space to be used for caching said content item, etc.

According to an embodiment of the present invention, software component 130 installed within each user's terminal enables each user to search the overall items index (of all content items stored on the registered users' terminals) for a particular content item that he wishes to remotely access, without the need to surf to the predefined Web site. For conducting such a search, software component 130 can provide a corresponding User Interface on the terminal of said each user.

According to a further embodiment of the present invention, if more than one user's terminal stores a content item, which is requested to be remotely accessed by another user, then one or more parameters are analyzed for determining from which user this item should be accessed. For example, such parameters can be: the bandwidth of each user's network connection; a type of a Web terminal (e.g., laptop, mobile device, personal computer, etc.); reliability of each user (that can be, for example, determined statistically, based on the previous accessing of one or more content items from said each user); geographic proximity between the user that provides an access to said content item and the user that remotely accesses said content item; payment that is requested by users for providing an access to said content item; etc.

It should be noted that according to an embodiment of the present invention, the content item can be any digital content item related to any contents, such as a song, video film, photo, picture, audio, game, software application, or any other.

In addition, it should be noted that according to an embodiment of the present invention, software component 130 is installed only on users' terminals, from which the content items are provided. According to another embodiment of the present invention, the user that remotely accesses said content item is also required to install such a software component 130 on his Web terminal (e.g., on cellular phones 110). The installed software components 130 provide to users appropriate User Interfaces for enabling an access, thereby accessing the remotely stored content items.

Further, it should be noted that according to an embodiment of the present invention, data network 130 can be any network, such as the Internet, wireless, wired, cellular, satellite, LAN (Local Area Network), Extranet, P2P or any other network.

Figure 2A:
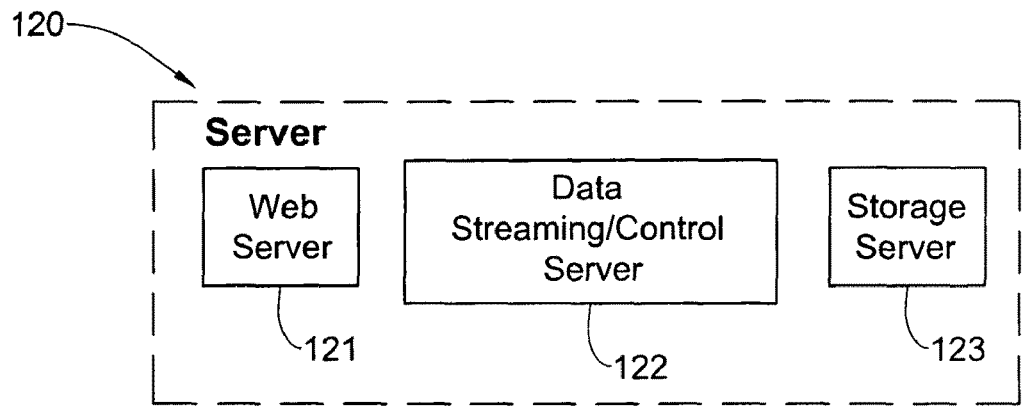
FIG. 2A is a schematic illustration of a server for enabling remote access to digital content items over a data network (such as the Internet, cellular network, etc.), according to an embodiment of the present invention.

FIG. 2A is a schematic illustration of server 120 for enabling remote access to digital content items over data network 135 (such as the Internet, cellular network, etc.), according to an embodiment of the present invention. Server 120 is configured to have the functionality (and corresponding hardware/software) of one or more of the following: Web server 121 for hosting a Web site, by means of which users can remotely access digital content items (songs, video films, photos, pictures, games, software applications, etc.); Data Streaming/Control server 122 for enabling remote access to digital content items from one user's terminal (or from the cache of server 120) to another user's terminal by streaming said digital content items to said another terminal; and Storage server 123 for caching the streamed digital content items and storing them for later usage.

According to an embodiment of the present invention, software component 130 installed on one user's terminal enables streaming the requested digital content item from said user's terminal to one or more other terminals via server 120 (via Streaming/Control server 122). When a user requests to remotely access a particular content item from his user's terminal (e.g., cellular phone 110), server 120 communicates with a corresponding terminal that stores such an item (e.g., personal computer 105'), and interconnects between said cellular phone 110 and personal computer 105'. After that, software component 130 installed on said personal computer 105', starts streaming the requested particular content item to said cellular phone 110. The cellular phone user can start using (e.g., listening, watching, playing, reading and the like) its content substantially in real-time, without the need to store it on his terminal. For example, if the remotely accessed content item is a song, then the user can start listening to the song in real-time; if the remotely accessed content item is a video clip, then the user can start watching it in real-time. Further, the content item can be cached and stored within Storage server 123 for later usage. Such caching can occur while the content to Storage server 123, item (e.g., a file) is streamed from one user's terminal to another. According to another embodiment of the present invention, content items can be uploaded from user's terminal prior to streaming them to one or more other terminals. Thus, when a user wishes to remotely access a content item from another user, while said content item is already cached (stored) by Storage server 123, then such an item is provided to him directly from the cache of Storage server 123, and the terminal, from which it is originally provided, can stay offline.

According to an embodiment of the present invention, server 120 controls remote accessing of a digital content item from one user's terminal (or from the cache of said server 120) to another terminal. According to another embodiment of the present invention, software component 130, installed within user's terminal, from which a digital content item is provided and/or within user's terminal from which said content item is remotely accessed, controls remote accessing of said digital content item. Thus, the control can be performed either by means of server 120 and/or by means of software component(s) 130.

According to an embodiment of the present invention, the content item can be remotely accessed for a predefined sum of money, e.g., $1 per minute, $10 per day, etc. Such price can be set, for example, by a provider of server 120 and/or by a provider of software component 130 for enabling user to remotely access one or more desired content items (e.g., songs, movies, photos, textual data, etc.). When a user remotely accesses a content item stored on his other terminal at a remote location (e.g., at home), then he can pay only to said provider(s) for using such service. On the other hand, when a user remotely accesses a content item stored on (or provided from) the terminal of another user, then an additional payment may be requested by said another user. According to another embodiment of the present invention, the content item can be remotely accessed for a fixed sum of money: for example, $100 for an unlimited period of time.

Further, it should be noted that Web server 121, Data Streaming server 122 and Storage server 123 can be physically located on different (remote) servers.

In addition, according to an embodiment of the present invention, when receiving a request from a user to borrow a content item, it is checked whether such content item is already cached by means of Storage server 123 and is stored within it. Such check, for example, can be performed by comparing the file size and file type of the requested content item with the same of the content items stored within said Storage server 123. If it is determined that such content item is already stored within said Storage server 123, then it can be provided to a borrower directly from said Storage server 123 without uploading it from lender's Web terminal.

Figure 2B:
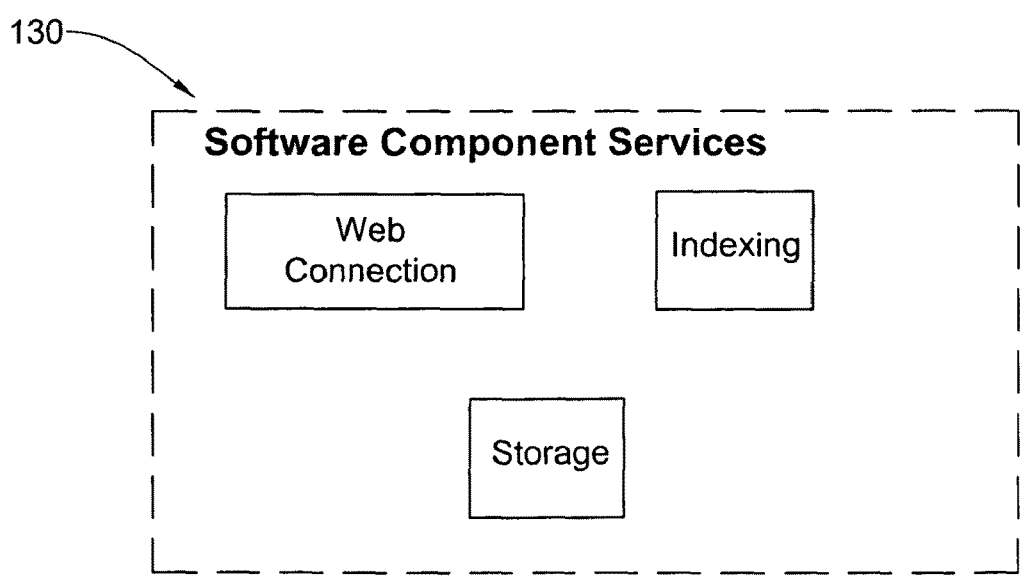
FIG. 2B is a schematic illustration of basic characteristics (services) of a software component, according to an embodiment of the present invention.

FIG. 2B is a schematic illustration of basic characteristics (services) of software component 130, according to an embodiment of the present invention. Software component can provide Web connection from each user's terminal to server 120 (FIG. 1) for providing a remote access for digital content items stored within users' terminals over data network 135 (FIG. 1). Also, software component 130 can determine content items stored on (provided from) each user's terminal, which can be authorized by corresponding users for being remotely accessed by other one or more users. For that, each user can store such content items within a predefined folder that is "recognized" by software component 130 (e.g., a folder named as "Sharing"). Software component indexes such content items and uploads their index to server 120, giving rise to an items index. In addition, when a new content item is uploaded to the terminal, software component 130 can substantially immediately update the items index of said terminal. Also, the items index of each terminal can be updated, for example, once a day, twice a day, etc. The indexes of content items from all users' terminals can be unified, giving rise to an overall items index. Such overall items index can also be stored within server 120. Thus, a user wishing to access a particular content item, by registering and logging in a predefined Web site (that can be hosted by server 120) can see which items can be provided from each Web terminal over data network 135. The user can further search by means of said (overall) items index for a specific content item that he wishes to access. He can either search by means of the items index of each user's terminal and/or by means of the overall items index of all users' terminals connected to said data network 135.

According to an embodiment of the present invention, each content item to be remotely accessed can be indexed according to various parameters/metadata, such as a category, genre, name, file extension, cost for accessing said each content item, and the like. Thus, for example, when a user surfs to a predefined Web site for remotely accessing a particular content item stored on another Web terminal, he is able to search for such content item (by means of the items index) within a corresponding category or genre, to which said particular content item is related.

According to an embodiment of the present invention, the (overall) items index can be edited, reorganized, ranked (e.g., creating a favorites songs or movies playlist), and the like by means of server 120 provider or by any other authorized party. Further, each user, whose items index was conveyed to said server 120 from his Web terminal, can edit his said items index (e.g., by surfing to a predefined Web site) and can edit other items indexes within said server 120, according to predefined authorizations.

Figure 3A:
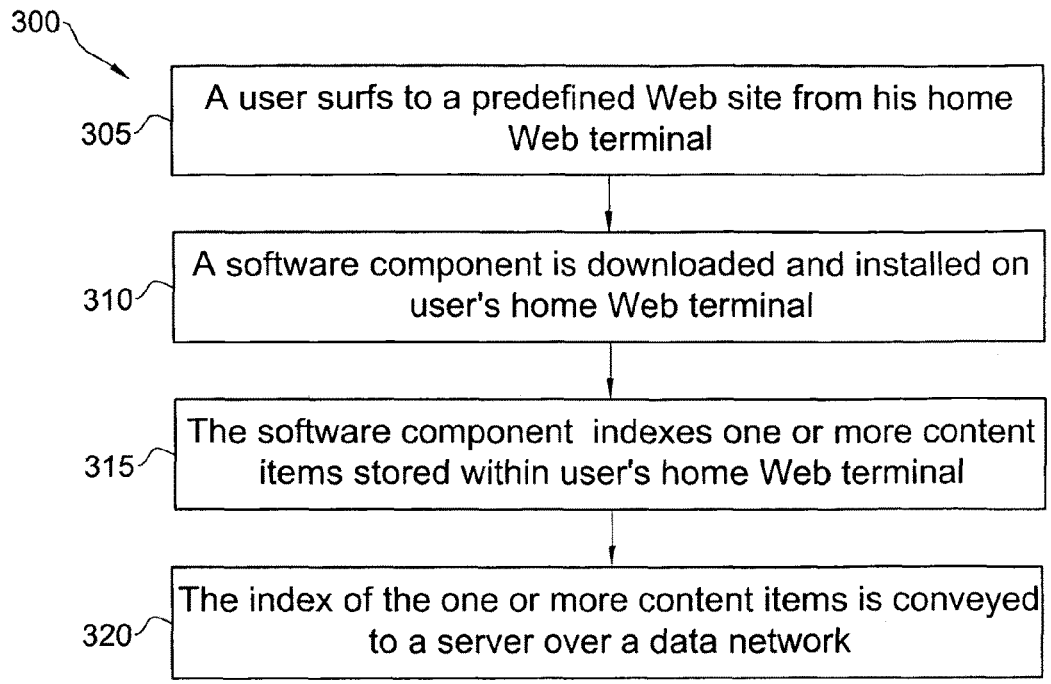
FIG. 3A is a flow-chart of a method for enabling remote access to digital content items over a data network, according to an embodiment of the present invention.

FIG. 3A is a flow-chart 300 of a method for enabling a remote access to digital content items over a data network, according to an embodiment of the present invention. At step 305, a user wishing to enable an access to a content item stored on his Web terminal (e.g., personal computer 105' (FIG. 1)), surfs from said personal computer 105' to a predefined Web site over data network 135 (FIG. 1), and then registers within said Web site. Such a Web site can be hosted, for example, by server 120 (FIG. 1). At step 310, software component 130 (FIG. 1) is downloaded from said Web site and installed on said personal computer 105'. Then, at step 315, software component 130 determines and indexes content items stored on said personal computer 105', which are authorized by the user of said personal computer 105' to be remotely accessed. For that, such content items can be stored within a predefined folder that is "recognized" by said software component 130 (e.g., a folder named "Sharing"). At step 320, the index of content items of said personal computer 105' is conveyed (e.g., uploaded) to server 120.

According to an embodiment of the present invention, each content item to be remotely accessed can be indexed according to various parameters/metadata, such as a category, genre, name, file extension, cost for accessing said each content item, and the like. Thus, for example, when a user wishes to remotely access a particular content item, he surfs to a predefined Web site and searches by means of items index (provided by said Web site) for such content item within a corresponding category or genre, to which said particular content item is related.

Figure 3B:
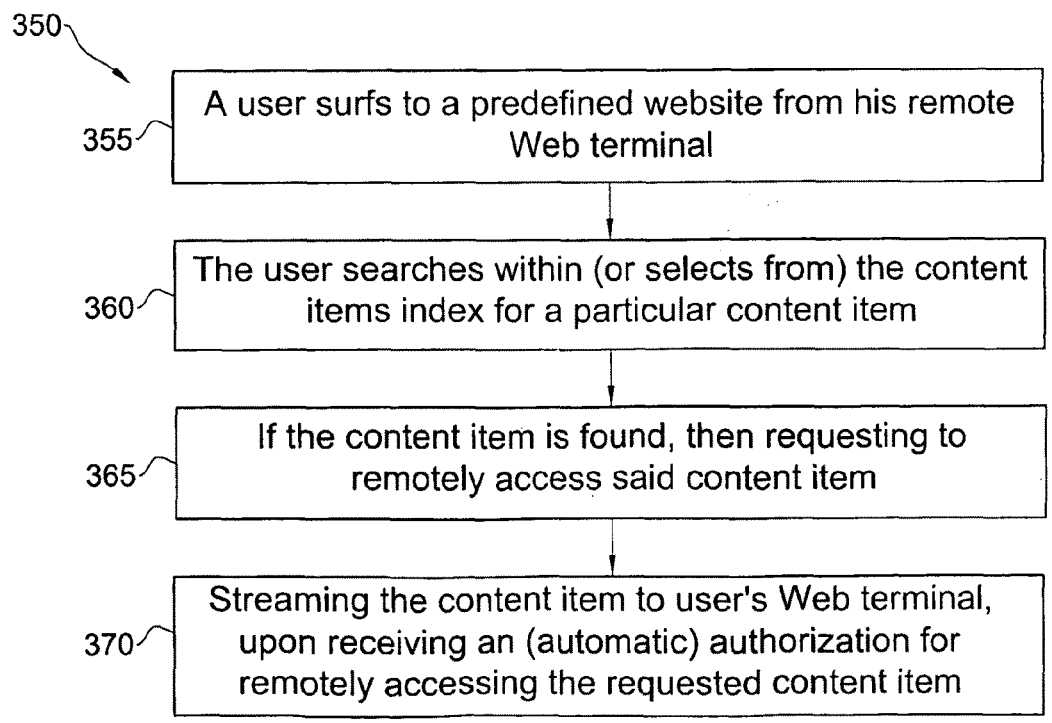
FIG. 3B is a flow-chart of a method for remotely accessing digital content items over a data network, according to an embodiment of the present invention.

FIG. 3B is a flowchart 350 of a method for remotely accessing digital content items over a data network, according to an embodiment of the present invention. At step 355, a user wishing to remotely access a particular content item, surfs from his Web terminal (e.g., from cellular phone 110 (FIG. 1)) to a predefined Web site over data network 135 (FIG. 1). Such a Web site can be hosted, for example, by server 120 (FIG. 1). According to an embodiment of the present invention, the user registers within said Web site and/or downloads (e.g., from said Web site) and installs software component 130 on his cellular phone 110. At step 360, the user searches (requests) for a particular (predefined) content item (e.g., the "Stronger" song of Britney Spears) by means of the (overall) index of content items, that is stored on server 120. Such a particular content item can be stored on one or more Web terminals over data network 135. It should be noted that according to another embodiment of the present invention, the user can search and remotely access only content items, which are stored on his remote Web terminal (e.g., his home computer). If said particular content item is found within the Web terminal of another user, then at step 365, a request to remotely access said item is sent to said another user (via server 120), which in turn receives the request, and authorizes it. It should be noted that according to an embodiment of the present invention, all requests are processed and authorized automatically.

It should be noted that according to another embodiment of the present invention, the user can search and remotely access only content items, which are stored on his remote Web terminal (e.g., his home computer). Thus, sending the request for accessing the particular content item is not required.

After that, at step 370, software component 130 installed within the Web terminal (e.g., personal computer 105', which stores the requested content item), enables streaming of said content item from said personal computer 105' to another Web terminal, which requested an access to said content item (e.g., to cellular phone 110). It should be noted that the content item can be streamed to cellular phone 110 via server 120, or directly from said personal computer 105' to cellular phone 110. Thus, according to an embodiment of the present invention, the user of cellular phone 110 starts using (listening, playing, watching and the like) the content of the requested content item (e.g., song, video film, game, etc.) substantially in real-time.

According to a further embodiment of the present invention, system 100 can function without server 120, by communicating from one user's terminal to another by means of software component(s) 130, installed on said users' terminals.

According to a still further embodiment of the present invention, the user, after playing the content item (e.g., watching a video film) that was streamed to his Web terminal, can play back said content item again upon the need.

It should be noted that according to an embodiment of the present invention, a program storage device readable by machine, tangibly embodying a program of instructions executable by the machine is configured to perform methods of the present invention, according to FIGS. 1 to 3B.

While some embodiments of the invention have been described by way of illustration, it will be apparent that the invention can be put into practice with many modifications, variations and adaptations, and with the use of numerous equivalents or alternative solutions that are within the scope of persons skilled in the art, without departing from the spirit of the invention or exceeding the scope of the claims.

The invention claimed is:

1. A server capable of providing a digital content item substantially in real-time from at least one user's terminal to another user's terminal by streaming it to said another user's terminal, said server being associated with at least a storage server capable of storing digital content items, wherein said server is operable to perform at least the following:
   connect at least a first user's terminals to a data network;
   obtain an index of at least one digital content item provided from said at least first user's terminal over said data network; and
   enable providing the digital content item, indicated within said index, in response to a request, to another user's terminal over said network by enabling streaming it substantially in real-time to said another user's terminal,
   wherein said server is further operable to provide said content items directly from said server in case said content items are stored in said storage server, and to provide said content items from said first user's terminal, via said server, in case said content items are not stored in said storage server.

2. The server according to claim 1, further operable to store said digital content items within the storage server.

3. The server according to claim 1, further operable to upload and store said digital content items in said storage server prior to said request.

4. A system configured to provide a digital content item substantially in real-time from at least one user's terminal to another user's terminal over a data network, said system comprising:
   at least two users' terminals connected to a data network, wherein at least one of said at least two users' terminals requests at least one digital content item stored in another user's terminal; and
   a server connected to said data network, said server comprising a storage server for storing said at least one digital content item and operable to connect to said at least one user's terminal and in response to said request enable providing said at least one digital content item to said another one user's terminal by streaming it substantially in real-time,
   wherein said server is further operable to provide said at least one digital content item directly from said server in case said at least one digital content item is stored in said storage server, and to provide said at least one digital content item from said another user's terminal, via said server, in case said at least one digital content item is not stored in said storage server.

5. The system according to claim 4, wherein the server is configured by means of at least one of the following:
   a web server for hosting at least one web site, and for enabling users' terminals to connect to said at least one web site; and
   a data streaming server for enabling streaming the at least one digital content item from the one user's terminal to one or more other users' terminals.

6. The system according to claim 4, wherein the at least one digital content item is stored in the storage server.

7. The system according to claim 4, wherein the user registers within a Web site for enabling a remote access from his at least one user's terminal or for remotely accessing the digital content item from said at least one user's terminal.

8. The system according to claim 4, wherein the at least one digital content item is uploaded by the server, prior to said request by said at least one user's terminal.

9. The system according to claim 4, wherein a software component is installed on the user's terminal for indexing one or more content items provided from said user's terminal, giving rise to the items index.

10. The system according to claim 9, wherein the items index is provided to the server.

11. The system according to claim 10, wherein the items index from users' terminals is unified within the server, giving rise to an overall items index.

12. The system according to claim 11, wherein the user searches within the items index or within the overall items index, looking for a particular content item, which he wishes to remotely access.

13. The system according to claim 4, wherein the user remotely accesses the content item for a predefined period of time.

14. The system according to claim 4, wherein the user that remotely accesses the content item makes a payment for accessing said content item.

15. A method of providing at least one digital content item substantially in real-time from at least one user's terminal to another user's terminal over a data network, said method comprising operating a server to perform at least the following:
   indexing at least one digital content item provided from at least one user's terminal over a data network, giving rise to an items index;
   receiving a request to provide a digital content item to another user's terminal over said data network;
   conducting a search for the requested digital content item by means of said items index; and
   if said requested digital content item is found within said items index, providing said requested digital content item to said another user's terminal directly from said server in case said requested digital content is stored in a storage server associated with said sever, and from said at least one user's terminal, via said server, in case said requested digital content is not stored in said storage server, said providing said requested digital content item being performed over said data network by streaming said digital content item substantially in real-time to said another user's terminal.

16. The method according to claim 15, further comprising conveying a software component to user's terminal for indexing the at least one content item to be provided from said user's terminal.

17. The method according to claim 15, further comprising indicating the metadata of each content item within the items index.

18. The method according to claim 15, further comprising conveying the items index from the at least one user's terminal to the server.

19. The method according to claim 15, further comprising surfing to a predetermined Web site for searching for the particular content item.

20. The method according to claim 15, further comprising configuring the server with at least one of the following:
   a web server for hosting at least one web site, and for enabling users' terminals to connect to said at least one web site;
   a data streaming server for enabling streaming the at least one digital content item from the at least one user's terminal to another user's terminal; and
   a storage server for storing the at least one digital content item to be provided to said another users' terminal.

21. The method according to claim 15, further comprising controlling providing the requested digital content item from the at least one user's terminal to another user's terminal by means of the server.

22. The method according to claim 15, further comprising storing the at least one digital content item in the storage server.

23. The method according to claim 15, further comprising uploading and storing the at least one digital content item in the storage server, prior to receiving said request.

24. The method according to claim 15, further comprising registering within a Web site for providing the digital content item from the at least one user's terminal to another user's terminal.

25. The method according to claim 15, further comprising requesting to provide the digital content item from the at least one user's terminal to another user's terminal.

26. The method according to claim 15, further comprising providing the digital content item for a predefined period of time.

27. The method according to claim 15, further comprising enabling the user, to which the digital content item is streamed, to make a payment for accessing said content item.

28. A method of providing at least one digital content item substantially in real-time from at least one user's terminal to another user's terminal over a data network, said method comprising operating a server to perform at least the following:
   receiving a request from the at least one user to remotely access said digital content item, without uploading said content item onto said another user's terminal; and
   providing said requested digital content item to said another user's terminal directly from said server in case said requested digital content is stored in a storage server associated with said sever, and from said at least one user's terminal, via said server, in case said requested digital content is not stored in said storage server, said providing said requested digital content item being performed over said data network by streaming said digital content item substantially in real-time to said another user's terminal.

29. The method according to claim 28, further comprising conveying a software component to user's terminal for indexing the at least one content item to be provided from said user's terminal.

30. The method according to claim 28, further comprising configuring the server with at least one of the following:
   a web server for hosting at least one web site, and for enabling users' terminals to connect to said at least one web site; and
   a data streaming server for enabling streaming the at least one digital content item from the at least one user's terminal to the another user's terminal.

31. The method according to claim 28, further comprising controlling providing the requested digital content item from the at least one user's terminal to the another user's terminal by means of the server.

32. The method according to claim 28, further comprising storing the at least one digital content item in the storage server.

33. The method according to claim 28, further comprising uploading the at least one digital content item to the server, prior to said request.

34. The method according to claim 28, further comprising registering within a Web site for providing the digital content item from the at least one user's terminal to the another user's terminal.

35. The method according to claim 28, further comprising requesting to provide the digital content item from the at least one user's terminal to the another user's terminal.

36. The method according to claim 28, further comprising providing the digital content item for a predefined period of time.

37. The method according to claim 28, further comprising enabling the user, to which the digital content item is streamed, to make a payment for accessing said content item.

38. A program storage device readable by machine, tangibly embodying a program of instructions executable by the machine to perform a method of providing at least one digital content item substantially in real-time from at least one user's terminal to another user's terminal over a data network, said method comprising operating a server to perform at least the following:
   indexing at least one digital content item provided from at least one user's terminal over a data network, giving rise to an items index;
   receiving a request to provide a digital content item to another user's terminal over said data network;
   conducting a search for the requested digital content item by means of said items index; and
   if said requested digital content item is found within said items index, providing said requested digital content item to said another user's terminal directly from said server in case said requested digital content is stored in a storage server associated with said sever, and from said at least one user's terminal in case said requested digital content is not stored in said storage server, said providing said requested digital content item being performed over said data network by streaming said digital content item substantially in real-time to said another user's terminal.

39. A program storage device readable by machine, tangibly embodying a program of instructions executable by the machine to perform a method of providing at least one digital content item substantially in real-time from at least one user's terminal to another user's terminal over a data network, said method comprising operating a server to perform at least the following:

receiving a request from the at least one user to remotely access said digital content item, without uploading said content item onto said another user's terminal; and providing said requested digital content item to said another user's terminal directly from said server in case said requested digital content is stored in a storage server associated with said sever, and from said at least one user's terminal, via said server, in case said requested digital content is not stored in said storage server, said providing said requested digital content item being performed over said data network by streaming said digital content item substantially in real-time to said another user's terminal.

* * * * *